United States Patent [19]
Puppolo et al.

[11] 3,822,397
[45] July 2, 1974

[54] CAPACITOR PACKAGE WITH A SPLIT METAL-PLATE TERMINAL COVER

[75] Inventors: Henry F. Puppolo, North Adams, Mass.; John T. Ogilvie, Bennington, Vt.

[73] Assignee: Sprague Electric Company, North Adams, Mass.

[22] Filed: May 7, 1973

[21] Appl. No.: 358,208

[52] U.S. Cl. ................................. 317/230, 29/570
[51] Int. Cl. ........................................... H01g 9/00
[58] Field of Search ............ 317/230, 242; 29/570; 174/50

[56] References Cited
UNITED STATES PATENTS

| | | | |
|---|---|---|---|
| 1,954,636 | 4/1934 | Lilienfeld | 317/230 |
| 2,244,395 | 6/1941 | Hill | 317/230 |
| 2,249,091 | 7/1941 | Robinson et al. | 317/230 |
| 3,654,524 | 4/1972 | Puppolo et al. | 317/230 |

*Primary Examiner*—Andrew J. James
*Attorney, Agent, or Firm*—Connolly and Hutz

[57] ABSTRACT

An aluminum electrolytic capacitor is housed in an aluminum can whose cover is made of two aluminum plates lying in the same plane, and insulated from the can and from each other by insulative layers of butyl rubber. The capacitor foils are connected to a stripline which is composed of two aluminum plates separated by a layer of butyl rubber. Each stripline plate is at right angles to one of the cover plates.

10 Claims, 4 Drawing Figures

PATENTED JUL 2 1974  3,822,397
Fig.1.
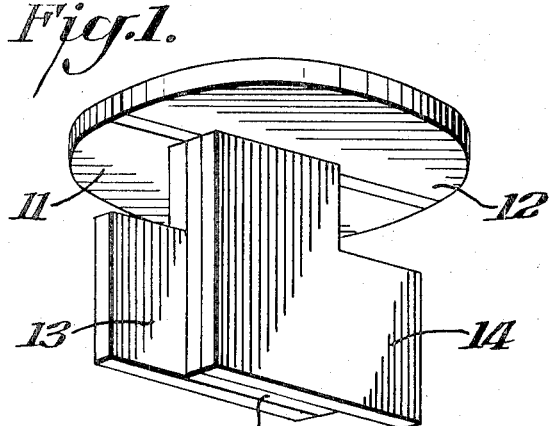
Fig.2.  Fig.4.
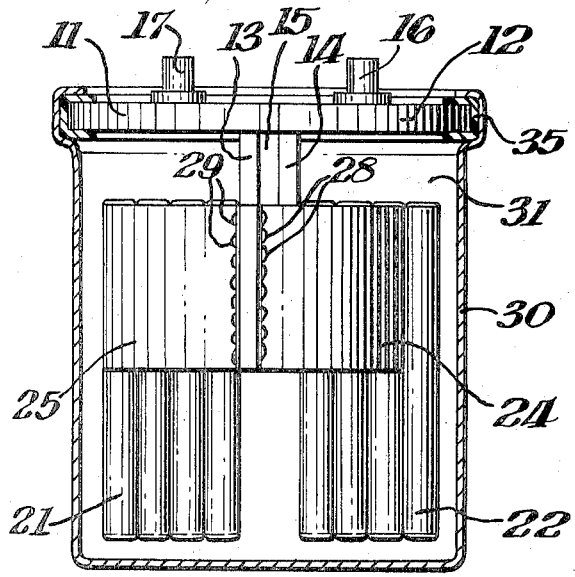
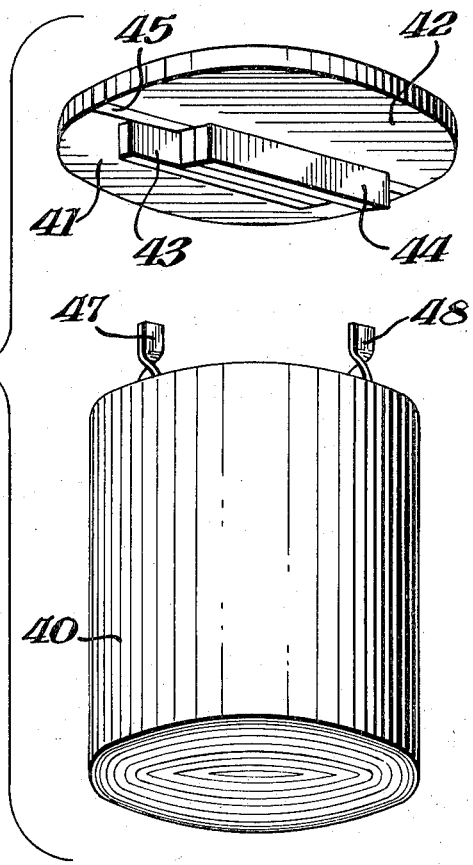
Fig.3.
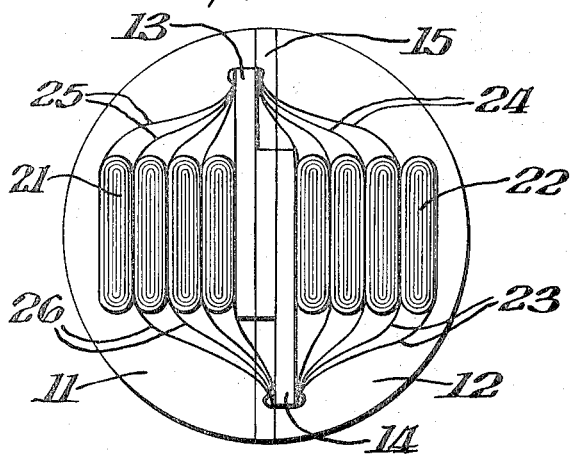

CAPACITOR PACKAGE WITH A SPLIT METAL-PLATE TERMINAL COVER

BACKGROUND OF THE INVENTION

This invention relates to electrolytic capacitors constructed and housed so as to be suitable for operation at high temperatures and having a low impedance over a broad frequency range.

For electrolytic capacitors that are intended to operate at temperatures of 85° C and higher, a dimethyl formamide (DMF) type electrolyte is usually chosen, since it will not corrode or react with the electrolytic capacitor foils at these temperatures as do the various borates that are commonly used for lower temperature applications. However at temperatures around 100° C the DMF electrolyte becomes reactive with most insulative materials such as the thermoplastics, silicone rubbers, epoxy resins and phenolic resins. The effect is to gradually attack the insulation as well as to contaminate the electrolyte. Successful high temperature designs are made wherein a small amount of such insulative materials is exposed to the DMF electrolyte inside the capacitor housing.

For high frequency operation, the capacitor construction must achieve a low effective series resistance (ESR) and a low effective series inductance (ESL). Toward this end, capacitor housings have incorporated a stripline connection between the capacitor and the package terminals. A particular construction having electrolytic foil capacitors connected to a stripline is described by H. F. Puppolo and M. Markarian in U.S. Pat. No. 3,654,524 issued Apr. 4, 1972.

Electrolytic capacitors are frequently used in d.c. power supply filtering applications wherein a large ripple current, usually about 120 Hz, flows in the capacitor. The heat generated by such ripple currents can cause excessive temperatures internal to the capacitor package. For a given ripple current, the rate of heat generation is proportional to the ESR of the capacitor. It is also desirable to design the capacitor such that internally generated heat may be conducted away as efficiently as possible, thus permitting a higher dissipation rating. The aforementioned stripline construction has been used effectively for this purpose.

An end connecting means for connecting capacitor foils to a stripline, contributes good thermal conduction, low ESL, low ESR, and low cost. Such a means is employed in an embodiment of the present invention and is taught in the invention of a Multisection Electrolytic Foil Capacitor, by M. Markarian and H. F. Puppolo, Ser. No. 358,207 filed concurrently herewith.

It is an object of the present invention to present an electrolytic capacitor package that is both suitable for operation at temperatures exceeding 100° C and having a low ESR and a low ESL.

It is a further object of this invention to provide a capacitor having improved means for removing heat from within the package.

These and other objects will become apparent from the following description.

SUMMARY OF THE INVENTION

A component package is described wherein a foil capacitor is housed in a metal can having a disc shaped cover. Each terminating electrode of each capacitor section so contained is attached to one of the two metal plates of a stripline. A subassembly comprising two similar metal pieces with an insulator therebetween, serves as said cover as well as said stripline. Each said metal piece has the form of a semicircular plate connected along its straight edge to the edge of a second plate, the two plates being at right angles. In the subassembly, the two semicircular plates lie in the same plane separated by an insulative layer so as to form the disc shaped cover. The other plates are mutually parallel and being separated by an extended portion of said insulative layer, form the stripline that is located within the housing.

BRIEF DESCRIPTION OF THE DRAWINGS

In FIG. 1 is shown a cover assembly, including a stripline, for use in a first preferred embodiment.

In FIG. 2 is shown, the sectioned view of a container can with the cover assembly of FIG. 1 and a capacitor mounted therein, shown in elevation side view.

In FIG. 3 is shown in bottom elevation view, the assembly of FIG. 2 with can and gasket removed.

In FIG. 4 is shown in exploded view, a second preferred embodiment with can and gasket removed.

DESCRIPTION OF THE PREFERRED EMBODIMENT

In FIG. 1 is shown in perspective elevation a cover assembly for the capacitor package of a first preferred embodiment of the present invention. A first and second metal plate 11 and 12, lying in the same plane, together form a circular disc. These two plates are separated by a layer of insulation 15. Third and fourth metal plates 13 and 14 are attached at right angles to the under surfaces of the first and second plates 11 and 12, respectively. The third and fourth metal plates 13 and 14 are separated by the extended insulation layer 15. Plates 11 and 13 are two distinct portions of a first unitary metal piece and likewise plates 12 and 14 are two distinct portions of a second unitary metal piece. These unitary metal pieces may be made by joining two metal plates, such as 11 and 13, at right angles by welding for example. Alternatively the unitary metal pieces may be formed by metal casting or by other suitable means.

In FIG. 2 is shown, within the sectioned container can 30, the side elevation of the mounted cover assembly of FIG. 1 with aluminum electrolytic capacitor sections attached. Eight capacitor sections are shown of which 21 and 22 are examples. The cover assembly formed by the first and second plates 11 and 12 have an insulative gasket 35 covering their outer periphery. This cover assembly is held in the open end of the can 30 by the can lip having been spun tightly around the cover assembly at its periphery, clamping against the gasket 35. Thus gasket 35 provides insulation between the can 30 and the plates 11 and 12. A metal terminal 16 is mounted to the outer surface of plate 12 and a metal terminal 17 is mounted to the outer surface of plate 11. These terminals have threaded holes (not seen) that provide means for physically mounting and electrically connecting the capacitor package by machine screws into the equipment in which it will be used.

In FIG. 3 is shown the bottom elevation, with reference to FIG. 2, of the package with the can 30 and gasket 35 removed. The structure and means of interconnection within the package of the eight aluminum foil electrolytic capacitor sections can more clearly be seen in this view. For example it can be seen that the rolled and flattened section 22 has one foil lead 23 attached to plate 14 by welds such as 28. The other foil lead 24 is seen to connect to plate 13 by welds such as 29. Similarly section 21 has a foil lead 25 connected to plate 13 and foil lead 26 connected to plate 14. All eight sections are similarly attached so that they are all connected in parallel. The full capacity of all eight sections is thus electrically terminated at the package terminals 16 and 17 via the stripline connective means, provided by the parallel plates 13 and 14 being separated and insulated from each other by the insulative layer 15. It is well known that such stripline structures exhibit inherently low series impedances and are capable of efficiently transmitting electrical energy within a broad frequency range from one end to the other.

The capacitor sections in this embodiment have only a portion of each foil end serving as a lead, the other portion being cut off. This feature is shown in FIG. 2 and serves to simplify the construction procedure by requiring less welding between foils and stripline plates.

Obviously, other capacitor types having foil electrodes, for example those employing plastic or paper dielectrics, may be advantageously connected and housed according to the principles of this invention. Also other suitable means of connecting foil electrodes to the stripline includes the well known extended foil connection method.

Prototypes of this first preferred embodiment have been constructed in cylindrical cans 4⅛ inches high and with 3 inch diameters. The plates were all 1/8 inch thick aluminum with stripline plates 13 and 14 each being welded to plates 11 and 12, respectively. Terminals 16 and 17 were also aluminum and were welded to plates 12 and 11, respectively. The insulative gasket 35 and insulative layer 15 were made of butyl rubber, both being 1/16 inch thick. The aluminum electrolytic foil capacitor sections were made by a normal process. Their anode foil leads were all attached to one stripline plate while their cathode foil leads were all attached to the other stripline plate. The foils were attached to the stripline plates by TIG (Tungsten Inert Gas) welding, a conventional process. The can 30 was deep drawn aluminum. The electrolyte used for impregnating the sections was dimethyl formamide (DMF) type. The use of DMF electrolytes is taught in U.S. Pat. No. 2,965,816. Obviously other electrolyte types will be suitable for use in capacitors of this invention.

Tests were conducted on these prototypes and the results compared to those made on equivalent size standard electrolytic capacitors. The standard capacitors chosen are a kind having been extensively employed for power supply filtering in computers, and are comprised of aluminum electrolytic capacitor sections with inserted tabs, a round phenolic cover having two metal terminals mounted therein and a connection between each tab and a terminal. Effective series inductance at 1KHz was less than 1 nanohenry while for the standard capacitors it is about 50 nanohenries. The ripple current carrying capability exceeded that of the equivalent size standard capacitor by about 50 percent. For example, a prototype capacitor having a voltage rating of 50 VDC provided a ripple current carrying capability of 30 amperes.

In FIG. 4 is shown the capacitor 40 and a cover assembly in exploded view relationship, according to a second preferred embodiment of the present invention. The gasket and can are not shown in FIG. 4 in the interest of clearly showing the differeing features of this second embodiment in comparison with those of the first.

Capacitor 40 is a single cylindrical aluminum foil electrolytic capacitor section having protruding inserted tab leads 47 and 48. One inserted tab connects internal to the section to the anode foil and the other tab connects to the cathode foil.

The cover assembly is comprised of two metal plates 41 and 42, lying in the same plane and separated by an insulative layer 45. Attached to plate 41 at right angles is a metal plate 43 and attached to plate 42 is a metal plate 44. As in the first preferred embodiment plates 41 and 43 form a unitary metal piece as do plates 42 and 44. The insulative layer 45 extends between plates 43 and 44 so that a small stripline is formed. Also, plates 43 and 44 are offset providing an open surface region on each for attachment of the capacitor tabs. Thus tab 47 connects to plate 43 and tab 48 connects to plate 44. The completed package of this second embodiment includes a can, a gasket, and an electrolyte all similar to those described for the first embodiment but not shown in FIG. 4. Two metal terminals, not seen in this view are attached to the plates 41 and 42 on their outside surfaces, in similar fashion to terminals 16 and 17 of FIG. 2.

Prototypes of this second embodiment were constructed. The plates were all 1/8 inch thick aluminum, plate pairs 43 and 41, and 44 and 42 being joined by welding. Insulative layer 45 was made of 1/16 inch thick butyl rubber. The foil tabs were connected to the stripline plates 43 and 44 by TIG welding. The can was deep drawn aluminum and the electrolyte was DMF type.

Tests were also conducted on the prototypes made according to the second preferred embodiment, and the results compared with the performance of the aforementioned standard capacitors of equivalent size and rating.

The inductance was about half that of the standard capacitors while current carrying capability exceeded that of the reference standards by about 20 percent.

Capacitors built in accordance with the principles of this invention clearly provide an improved thermal path between the inside of the package and the package environment. At the same time these capacitors provide an improved electrical conductivity between the capacitor sections and the package terminals. These features together partially account for the surprising degree of improvement in ripple carrying capability of the electrolytic foil prototypes. In addition, this construction provides a minimum exposure of insulating material to the chemically active high temperature DMF type electrolyte. Prototype packages 0of the first and second preferred embodiments also exhibit a lower effective series inductance than standard capacitors, thus enhancing their usefulness for effectively filtering high frequencies. Finally, it is noted that the capacitors of this invention are no larger physically than their standard capacitor counterparts.

Since it is obvious that changes and modifications may be made in the above described packages without departing from the nature and spirit of the invention, it is to be understood that the invention is not limited to these details except as set forth in the appended claims.

What is claimed is:

1. A capacitor package comprising:
   a. two semicircular metal plates lying in a plane, each having a dependent metal plate at right angles thereto and forming two distinct unitary metal pieces each having an "L" shape in profile;
   b. an insulative layer positioned between and being adjacent to said dependent metal plates for the purpose of forming a stripline, said semicircular metal plates being separated by an extension of said insulative layer and forming a circular cover for said capacitor package;
   c. at least one capacitor section having two wound foil electrodes, a connection being made between each said foil and one of said dependent stripline plates, respectively, said two semicircular plates additionally serving to provide electrical access to said at least one capacitor section from outside said package.

2. The capacitor package of claim 1 wherein said connection consists of welds at the ends of said two foils, said at least one section being partially unrolled.

3. The capacitor package of claim 1 wherein said connection consists of welds at the foil edges of said at least one section, said at least one section being wound in a normal extended foil fashion.

4. The capacitor package of claim 1 wherein said at least one section is flattened.

5. The capacitor package of claim 1 wherein said connection consists of normal inserted tabs in said at least one section being welded to said dependent plates, respectively.

6. The capacitor package of claim 1 further comprising a metal housing having one side open, an insulative gasket covering the periphery of said circular cover, said cover being fitted into said open side of said housing and being insulated therefrom by said gasket, said stripline and said at least one capacitor section being contained by said housing, a first and second metal terminal each being mounted to the outer surface of one of said two semicircular cover plates, respectively.

7. The capacitor package of claim 1 wherein said at least one capacitor section is a normal aluminum electrolytic foil type.

8. The capacitor package of claim 7 wherein said capacitor contains a dimethyl formamide type electrolyte.

9. The capacitor package of claim 7 wherein said insulative gasket and said insulative layer are made of butyl rubber.

10. The capacitor package of claim 7 wherein said housing and said metal pieces are made of aluminum.

* * * * *